US012601627B2

(12) United States Patent (10) Patent No.: US 12,601,627 B2
Wucher et al. (45) Date of Patent: Apr. 14, 2026

(54) METERING DEVICE

(71) Applicant: Schenk Process Europe GmbH, Darmstadt (DE)

(72) Inventors: Frank Wucher, Darmstadt (DE); Bernd Allenberg, Darmstadt (DE)

(73) Assignee: Qlar Europe Gmbh, Darmstadt (DE)

( * ) Notice: Subject to any disclaimer, the term of this patent is extended or adjusted under 35 U.S.C. 154(b) by 215 days.

(21) Appl. No.: 18/531,885

(22) Filed: Dec. 7, 2023

(65) Prior Publication Data

US 2024/0102846 A1 Mar. 28, 2024

Related U.S. Application Data

(63) Continuation of application No. PCT/EP2022/065421, filed on Jun. 7, 2022.

(30) Foreign Application Priority Data

Jun. 7, 2021 (DE) ..................... 10 2021 114 534.1

(51) Int. Cl.
*G01G 11/12* (2006.01)
*G01G 11/10* (2006.01)
(52) U.S. Cl.
CPC ............. *G01G 11/12* (2013.01); *G01G 11/10* (2013.01)
(58) Field of Classification Search
CPC ........ G01G 11/12; G01G 11/10; G01G 11/08; G01G 11/14; G01G 11/16; G01G 11/20
USPC ................... 222/52, 55, 56, 63, 64
See application file for complete search history.

(56) References Cited

U.S. PATENT DOCUMENTS

| | | | |
|---|---|---|---|
| 2,753,099 A | 7/1956 | Jenner et al. | |
| 9,527,665 B2 * | 12/2016 | Schlagel | B65D 90/587 |
| 10,106,333 B2 * | 10/2018 | Beaujot | B65G 47/19 |

FOREIGN PATENT DOCUMENTS

CN 207074078 U 3/2018

OTHER PUBLICATIONS

International Search Report dated Oct. 10, 2022 in corresponding application PCT/EP2022/065421.

* cited by examiner

*Primary Examiner* — David J Walczak
(74) *Attorney, Agent, or Firm* — Muncy, Geissler, Olds & Lowe, P.C.

(57) ABSTRACT

A metering device for discharging bulk material at a discharge opening, with a hopper for storing the bulk material, and a conveying device for conveying the bulk material from the hopper to the discharge opening. The hopper has an outlet opening through which the bulk material can be conveyed out of the hopper by the conveying device, and a slide gate, the position of which determines an outlet cross-section of the outlet opening. The metering device has a motor-operated actuator for adjusting the outlet cross-section, a control device for controlling the metering device and a motor-operated actuator for adjusting the slide gate, which is controlled via the control device as a function of a target feed rate.

9 Claims, 2 Drawing Sheets

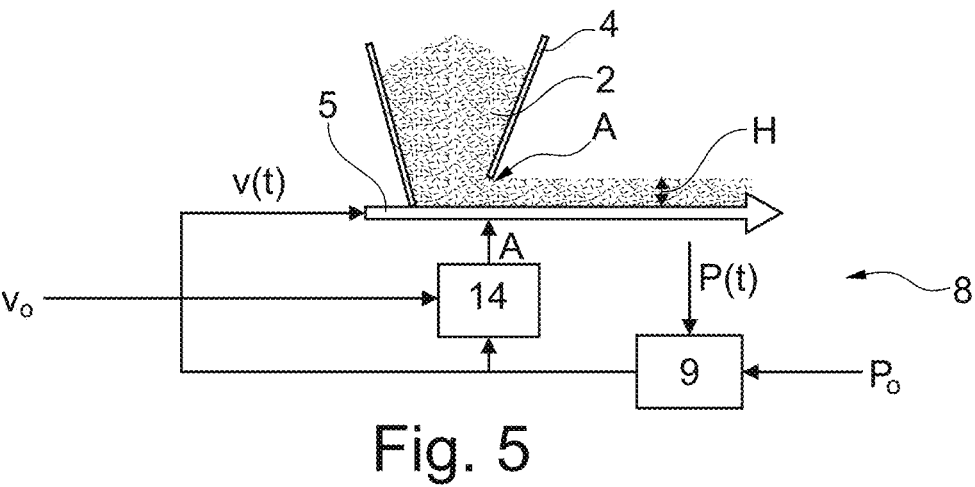
Fig. 5
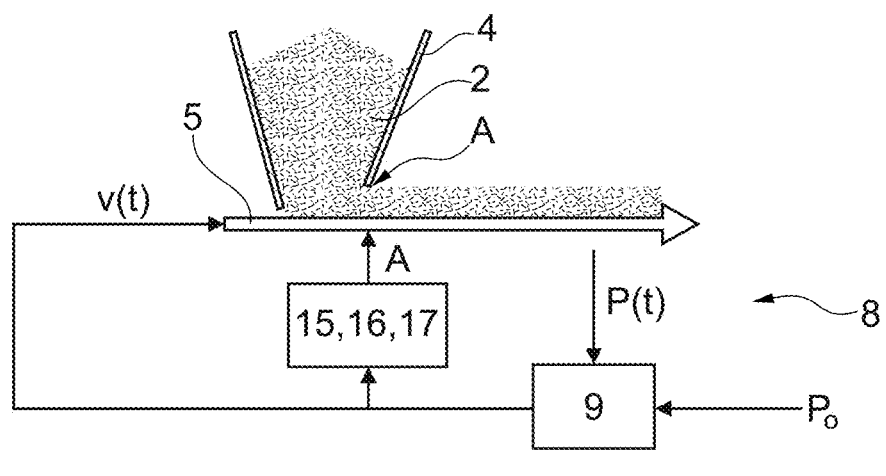
Fig. 6
Fig. 7

METERING DEVICE

This nonprovisional application is a continuation of International Application No. PCT/EP2022/065421, which was filed on Jun. 7, 2022, and which claims priority to German Patent Application No. 10 2021 114 534.1, which was filed in Germany on Jun. 7, 2021, and which are both herein incorporated by reference.

BACKGROUND OF THE INVENTION

Field of the Invention

The invention relates to a metering device for discharging bulk material at a discharge opening. For example, the metering device can be designed as a belt weighfeeder, a vibratory feeder or as a vibrating conveyor. The metering device has a hopper for storing the bulk material and a conveying device for conveying the bulk material from the hopper to the discharge opening. For example, the conveying device can be designed as a conveyor, such as a conveyor belt, a conveyor trough, a vibrating conveyor or an apron feeder. The hopper has an outlet opening through which the bulk material can be conveyed out of the hopper by means of the conveying device, as well as a slide gate whose position determines a cross-section of the outlet opening.

Description of the Background Art

From U.S. Pat. No. 2,753,099 A, for example, a metering device with a conveyor belt and a bulk material hopper with an adjustable closure, as well as a downstream belt scale, is known. If the actual weight deviates from a limit value, the closure of the bulk goods hopper is activated and the outlet opening is reduced or enlarged accordingly. However, the changed bulk material support on the conveyor belt can only be checked again by measuring the weight using the belt scale.

Furthermore, metering devices are already known from the state of the art in which the amount of the material, i.e., the dumping height (/thickness) of the bulk material to be conveyed on the conveying device, forms an essential parameter for the feed rate of the metering device in addition to the conveying velocity. In general, it is possible to increase the feed rate by increasing the conveying velocity, i.e., the belt speed, amplitude width or vibration frequency, depending on the conveying device, and/or by increasing the dumping height. In this case, an excessively high dumping height at a low conveying velocity can lead to the bulk material being discharged on or off a slope, which should be avoided. In addition, an insufficient dumping height, in particular due to an unfavorable weighing signal utilization or an unfavorable ratio between the conveying device and the bulk material, can lead to an inaccurate measurement of the bulk material mass, which in turn entails disadvantages with regard to the controllability of the metering device.

The dumping height can be adjusted via the so-called slide gate. The slide gate is designed in such a way that its position determines the cross-section of the outlet opening of the hopper, which is hereinafter also referred to as the opening cross-section, outlet cross-section, feed cross-section or outlet opening cross-section. This means that the position of the slide gate determines how much bulk material can flow/pour/move from the hopper onto the conveying device and be transported away from the conveying device (to the discharge opening). Thus, by adjusting the slide gate, the dumping height can be adjusted. In other words, the dumping height is directly dependent on the position of the slide gate or the outlet cross-section generated by it.

The well-known metering devices use a manually adjustable slide gate, which can be used to adjust the outlet cross-section and thus indirectly the dumping height when the metering device is switched off. Such manual setting or adjustment of the outlet cross-section is carried out, for example, at the start of production, at the end of production, in the event of large changes in the feed rate and possibly during a change in bulk material. Since the metering device has to be stopped for each adjustment of the slide gate, this can have a detrimental effect on production efficiency. This means that the outlet cross-section and thus the dumping height are kept constant during operation, so that the feed rate can only be adjusted via the conveying velocity.

However, it is not possible to achieve an optimal metering operation with such a metering device, in which the measurement accuracy is as high as possible, the discharge behavior is as uniform and reproducible as possible, a required feed rate range can be realized and in which uncontrolled flow of the bulk material is avoided at a standstill or when filling the hopper.

SUMMARY OF THE INVENTION

It is therefore an object of the invention to avoid and reduce the disadvantages of the conventional art. In particular, a metering device is provided with which the metering operation can be optimized and in which it is possible to react flexibly to changes, such as a change in feed rate, especially during operation.

An object of the invention is achieved by a metering device having a motor-operated actuator for adjusting the position of the slide gate and thus for adjusting the outlet cross-section. This means that the slide gate position and the outlet cross-section can be mechanically changed during operation. This means that the slide gate position and the outlet cross-section can be set and controlled automatically. This, in turn, means that the dumping height can be changed and thus controlled during operation by mechanically adjusting the outlet cross-section.

Accordingly, the motor-operated slide gate makes it possible to change the position of the slide gate during operation, i.e., without interrupting the conveying device. This means that it is possible to react flexibly to changing requirements, such as a higher feed rate or a higher conveying velocity. The fact that the slide gate can now be moved "automatically", i.e., controlled, opens up new possibilities for optimizing the operation of the metering device, since the outlet cross-section can be used as a control variable in addition to the conveying velocity. In other words, by providing the motor-operated actuator for the slide gate, the outlet cross-section can be modified during operation and thus used as a control parameter. This has the advantage of opening up a variety of new possibilities for optimized control of the metering device during operation. In addition, the metering device has a control device for controlling the metering device. For the sake of simplicity, the term control device can be used as a generic term for a control and/or regulating device. The control device may be designed in such a way that the control of the outlet opening, in particular an influence on the dumping height or the feed cross-section of the direct-pulling metering device, takes place as a function of a target feed rate.

The control device can be designed in such a way that the position of the slide gate and thus the outlet opening is determined as a function of an actual feed rate, one (or more) control variable(s) of the metering device, an on-signal, an actual feed cross-section/outlet cross-section, an actual amount of material/dumping height and/or a hopper fill level. Based on the process parameters mentioned, the dumping height/amount of material can be adjusted during operation by mechanically changing the outlet cross-section.

The control device may be designed to control the outlet cross-section as a function of a feed rate of the metering device, a conveying velocity of the metering device, a dumping height of the bulk material on the conveying device, a hopper fill level and/or an on/off signal of the metering device. This means that the control device controls the actuator, i.e., a position of the slide gate and thus also the outlet cross-section, in order to set a (target) dumping height on the conveying device.

The control device may have a position detection to detect an actual position of the actuator. For example, the position detection can be designed as a position sensor. Thus, the position sensor can be used to record the actual position of the actuator and this in turn can be used to record the actual position of the slide gate or an actual outlet cross-section. Depending on input parameters, the control device can use an algorithm to calculate a target position of the actuator. If the actual position deviates from the target position, the control device can send a signal to the actuator to adjust its position such that the actual position corresponds to the target position. As a result, the actual outlet cross-section can be mechanically adjusted to a target outlet cross-section.

This adjustment of the outlet cross-section serves in particular to achieve a certain (target) dumping height, which in turn serves in particular to achieve a certain (target) feed rate or uniform discharge behavior and high measuring accuracy.

The target position of the actuator or the outlet cross-section is set on the basis of the feed rate, in particular the actual feed rate and the target feed rate or a deviation between the actual feed rate and the target feed rate. Alternatively or additionally, the outlet cross-section is adjusted based on the conveying velocity, so that a desired target conveying velocity is obtained. Alternatively or additionally, the outlet cross-section is adjusted on the basis of the dumping height, in particular the actual dumping height. Alternatively or additionally, the outlet cross-section is set on the basis of the hopper fill level, in particular the actual hopper fill level. Alternatively or additionally, the outlet cross-section is set using the on/off signal. When setting the outlet cross-section, i.e., the target outlet cross-section, the actual outlet cross-section can optionally be taken into account in order to be able to form a control variable. The above-mentioned parameters allow for the metering device to be optimally controlled in different operating states, as they represent the key influencing variables for the operation of the metering device.

The control device can have a feed rate control loop with a first controller. The first controller controls the feed rate using the conveying velocity as a control variable. This means that the first controller controls the actual feed rate to the target conveying velocity using the conveying velocity as a control variable. In this case, the first controller compares the actual feed rate with the target feed rate and calculates a target value for the conveying velocity of the conveying device in order to control the actual feed rate to the target feed rate. The first controller can preferably be designed as a PID controller. Alternatively, it is also possible to use a different type of controller.

The control device can be designed in such a way that it controls the outlet cross-section based on the (target) feed rate. In particular, the control device can be designed in such a way that it controls the outlet cross-section on the basis of a feed rate-outlet cross-section characteristic curve. For example, the characteristic curve can be described by an analytical equation or defined by vertices. Preferably, the characteristic curve can run monotonically increasing between a minimum cross-section and a maximum cross-section. This means that the outlet cross-section can be controlled by defining it depending on the (target) feed rate or the relationship between a certain target feed rate and the outlet cross-section to be set, which is fixed according to the characteristic curve. For example, when the metering device is put into operation, the characteristic curve can be determined as a favorable determined function depending on the target feed rate, and the outlet cross-section can be controlled in continuous operation on the basis of this characteristic curve. This has the advantage that, for example, at low feed rates, a small slide gate opening/outlet cross-section is automatically adjusted in order to keep the discharge behavior uniform and thus the constancy high. In the case of high feed rates, on the other hand, a large slide gate opening/outlet cross-section is automatically set in order to be able to realize the high feed rate, as a maximum conveying velocity is usually limited.

The minimum cross-section may be determined depending on the type of bulk material, in particular the particle size of the bulk material. The minimum cross-section is preferably chosen in such a way that the bulk material can flow out of the hopper. The minimum cross-section can also be determined depending on a predetermined useful signal-to-error ratio. The useful signal is a measurement of the actual load and the error is understood to be a measurement error of the measurement method used for the feed rate. To put it simply, this means that if the outlet cross-section is too small, the dumping height on the conveying device is so low that an unavoidable measurement inaccuracy leads to a high relative measurement deviation of the actual feed rate.

The maximum cross-section may be determined depending on the type of bulk material, in particular the particle size of the bulk material, and/or depending on the dimensions of the conveying device. In particular, the maximum cross-section can be chosen in such a way that the bulk material cannot flow out of the hopper or to the side of the conveying device without activity on the part of the conveying device.

The control device may have a filter. The filter is designed in such a way that it smooths out the signals for the feed rate, in particular the target feed rate, as an input variable for controlling the outlet cross-section. By controlling the feed rate via the first controller, the conveying velocity, in particular the target conveying velocity, is determined after a change in the outlet cross-section in such a way that the actual feed rate becomes equal to the target feed rate. To ensure that changes in the outlet cross-section do not lead to major metering errors, rapid changes in the target feed rate are smoothed out by the filter. Preferably, a time constant of the first controller is shorter than a filter time constant of the filter. Due to the (significantly) larger filter time constant than the resulting time constant of the guiding behavior of the feed rate-control loop, control fluctuations or large control deviations can be avoided.

The control device may be designed in such a way that, if the on/off signal is an off-signal, it controls the outlet cross-section to an off-position of the slide gate and operates the conveying device for a predetermined period of time and/or until it falls below a predetermined actual dumping height after reaching the off-position. In other words, the outlet cross-section is set to the off-position by means of a switch, wherein the off-section is an outlet cross-section that is completely or mostly closed, preferably more than 80%. This can prevent bulk material from leaking out of the hopper when the conveying device is not running. Especially in the case of well-flowing or free-flowing bulk material and a stationary conveying device or when filling the hopper for the first time, it is necessary to set the slide gate to the off-position to prevent uncontrolled discharge. In addition, it is preferable to continue to operate the conveying device for some time after starting up the off-position in order to reduce the dumping height below a predetermined actual dumping height, in particular to a value of zero. Especially in the case of hot bulk materials, such emptying of the conveying device system is necessary. In this way, it can be achieved that the dumping does not interfere with the start-up operation/control behavior when stopping large feed rates, i.e., at high dumping levels, and restarting with low feed rates, i.e., at low dumping levels.

The control device may have a conveying velocity control loop with a second controller. The second controller controls the conveying velocity using the outlet cross-section as the control variable. This means that the second controller controls an actuating conveying velocity to a target conveying velocity using the outlet cross-section as a control variable. The second controller compares the actuating conveying velocity with the target conveying velocity and determines an actuation value for the outlet cross-section in order to control the actuating conveying velocity to the target conveying velocity at a given target feed rate. In other words, the first controller uses the target feed rate to determine how high the conveying velocity must be in order to achieve this target feed rate at the set outlet cross-section. If the actuating conveying velocity determined by the first controller is again higher than the specified target conveying velocity, the second controller increases the outlet cross-section, whereby the actuating conveying velocity determined by the first controller can be regulated to the specified target conveying velocity. The second controller can preferably be designed as a PID controller or as a two-point controller. Alternatively, it is also possible to use a different type of controller.

The first control loop and the second control loop can be cascaded. Cascading divides the control device into several sections and increases control accuracy. Preferably, the time constant of the first loop controller can be shorter than a time constant of the second loop controller. This avoids control vibrations.

The control device can be designed to determine the feed rate-outlet cross-section characteristic curve by changing the feed rate over its (entire) operating range and by recording the control variable of the conveying velocity-control loop, i.e., the outlet cross-section, as a function of the feed rate. This has the advantage that the characteristic curve can be determined automated, so that it no longer has to be determined manually during commissioning. For this purpose, the target feed rate can be changed beyond its range to be expected in normal metering operation, and the resulting outlet cross-section can be determined and stored in the characteristic curve. In this way, a cascaded control can be avoided.

The control device may have a pilot control that controls the actuator based on the feed rate outlet cross-section characteristic curve and the conveying velocity control loop for fine adjustment. By combining the pilot control with the control of the conveying velocity via the control variable of the outlet cross-section, the stability of the cascaded control loops can be further increased while maintaining the same metering accuracy, in particular by setting the outlet cross-section control loop to act more slowly.

The control device may have a linearizing element. The linearizing element represents a non-linear relationship between the outlet cross-section and the dumping height via an outlet cross-section-dumping height characteristic curve. This has the advantage that even if there is a non-linear relationship between the outlet cross-section and the (actual) dumping height, compensation can be carried out by linearization in the control variable branch, so that a more stable operation of the conveying velocity control loop is ensured. For example, the non-linearity as a function of the bulk material can be determined during commissioning.

The control device may be designed to determine the outlet cross-section-dumping height characteristic curve by automatically changing the outlet cross-section over its (entire) operating range and recording the dumping height as a function of the outlet cross-section. This has the advantage that the characteristic curve can be determined automated during commissioning of the metering device instead of being manually determined.

The control device may have a vibration analyzer and a vibration control element to avoid vibrations of the actuating-conveying velocity and/or an actual conveying velocity. The vibration analyzer is designed to detect vibrations of the actuating conveying velocity and/or the actual conveying velocity. The vibration control element is designed to change the outlet cross-section by a predetermined or random amount when the vibrations of the actuating conveying velocity and/or the actual conveying velocity are detected. In an example, a time constant of the first controller should be shorter than the time constant of the vibration analyzer and/or vibration control element. As a result, amplification of the vibrations can be avoided. According to an example, the control device may be designed to transmit an information signal to a user when vibrations of the actuating conveying velocity and/or the actual conveying velocity are detected. In this way, it can be avoided that the conveying device permanently oscillates between two states in the event of discontinuities between the actuating conveying velocity and the actual conveying velocity, since the oscillation processes are detected and the outlet cross-section is changed by a random amount, which in turn results in a different average velocity that is away from the discontinuity point. The detection of such oscillation processes is important, otherwise they lead to errors in the feed rate or can be an indication of wear or other unstable operating conditions.

The control device may have an outlet cross-section analyzer as well as an outlet cross-section control element to avoid operation outside a range between the minimum cross-section and the maximum cross-section. The outlet cross-section analyzer is designed to detect an outlet cross-section moving towards the minimum cross-section and/or the maximum cross-section. The outlet cross-section control element is designed to reduce the conveying velocity when the outlet cross-section moving towards the minimum cross-section is detected and to increase the conveying velocity when the outlet cross-section moving towards the maximum cross-section is detected. In an example, a time constant of the first controller should be shorter than the time constant of the outlet cross-section analyzer and/or the outlet cross-section control element.

The control device may have a conveying velocity analyzer and a conveying velocity control element to avoid operating outside a range between a minimum conveying velocity and a maximum conveying velocity. The conveying velocity analyzer is designed to detect a conveying velocity moving towards the minimum conveying velocity and/or maximum conveying velocity. The conveying velocity control element is designed to reduce the outlet cross-section when the conveying velocity moving towards the minimum conveying velocity is detected, and to increase the outlet cross-section when the conveying velocity moving towards the maximum conveying velocity is detected. In an example, a time constant of the first controller should be shorter than the time constant of the conveying velocity analyzer and/or the conveying velocity control element.

The control device may have a dumping height control loop with a third controller. The third controller controls the dumping height using the outlet cross-section as the control variable. This means that the third controller controls the actual dumping height to a target dumping height using the outlet cross-section as a control variable. The third controller compares the actual dumping height with the target dumping height and calculates a target value for the outlet cross-section in order to control the actual dumping height to the target dumping height. The third controller can preferably be designed as a PID controller. Alternatively, it is also possible to use a different type of controller. In other words, the dumping height can be kept constant, which is particularly necessary in the event of discharge problems from the hopper.

The control device may be designed to determine the dumping height and/or the feed rate gravimetrically—by means of one or more weighing sensors—by means of an optical sensor, a mechanical sensor, an electromagnetic sensor, by ultrasound or by a radar.

The control device may have a material bridge analysis element to avoid material bridges. The material bridge analysis element is designed to increase the outlet cross-section by a predetermined amount, especially for a short time, if a predetermined difference between an actual dumping height and a target dumping height is exceeded. In particular, the control device may be designed to transmit an information signal to a user when a predetermined difference between an actual dumping height and a target dumping height is exceeded.

The actuator can be designed, for example, as a linear motor or as a rotating (stepper) motor. For example, the actuator can be hydraulically or, preferably, electrically or pneumatically actuated. In particular, the outlet cross-section may have a cross-section that is larger in the middle than on the outside in a transverse direction that is transverse to the conveying direction of the conveying device. In addition, the outlet cross-section can have a cross-section that is circular, triangular or elliptical. The slide gate can be one-piece or multi-piece. The outlet cross-section can be limited symmetrically in the transverse direction by the slide gate or can be limited differently from the central axis in one transverse direction and in the other transverse direction. In particular, the slide gate for adjusting the outlet cross-section A can have an angle of 0° to 90° to the horizontal.

In summary, the invention relates to a device in bulk solids technology for adjusting the amount of material/dumping height during operation by mechanically altering the outlet cross-section, wherein the automated change of the dumping height as a function of a target feed rate was according to a dependence previously determined during an adjustment to the bulk material and/or a vibration amplitude for operation at an amplitude favorable for good gravimetric metering accuracy and/or a degree of filling of the discharge hopper. Preferably, the device can have an automatic adjustment function over the entire feed rate range in order to determine a relationship between the feed rate and the slide gate position. Furthermore, the device can have a self-regulating operation via a condition detection of the feed rate to a slide gate position at optimum oscillation range, i.e., a minimum dumping height/channel volume is set at an optimal vibration range. In addition, automatic usability of the entire feed rate range is possible without manual intervention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows a schematic representation of the control device in an example;

FIG. 6 shows a schematic representation of the control device in an example; and FIG. 7 shows a schematic representation of the control device in an example.

DETAILED DESCRIPTION

Figures 1, 2:
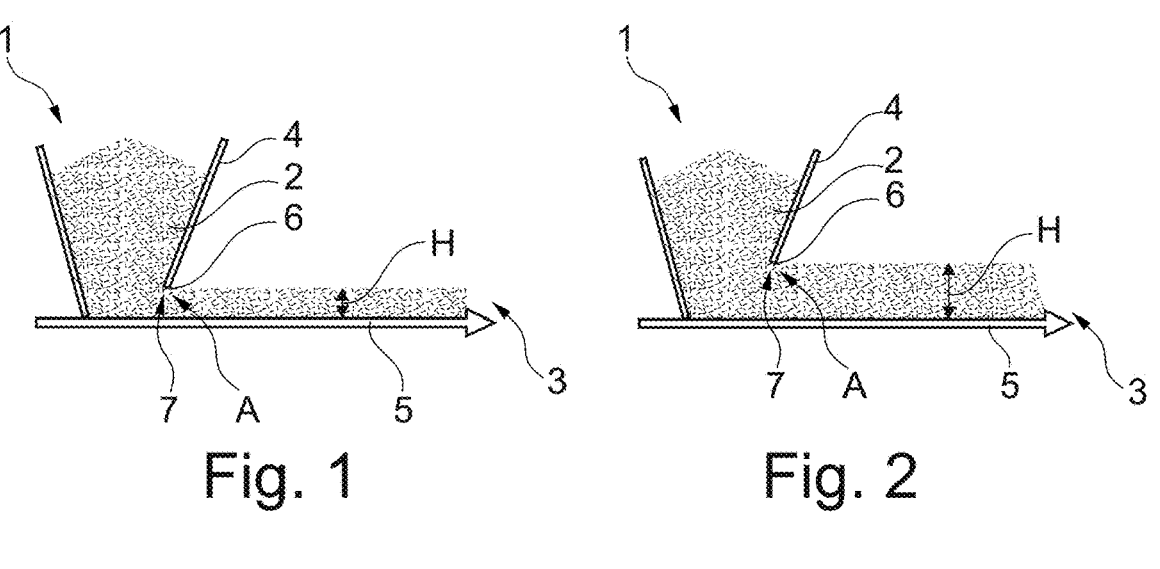
FIG. 1 shows a schematic representations of a metering device.
FIG. 2 shows a schematic representations of a metering device.

FIGS. 1 and 2 show schematic representations of a metering device 1 according to the invention for the discharge of bulk material 2 at a discharge opening 3. The metering device 1 has a hopper 4 for storing bulk material 2 and a conveying device 5 for conveying bulk material 2 from the hopper 4 to the discharge opening 3. For example, the conveying device 5 can be designed as a conveying means, such as a conveyor belt, a conveyor trough, a vibrating conveyor or an apron feeder. The hopper 4 has an outlet opening 6 through which the bulk material 2 can be conveyed from the hopper 4 by means of the conveying device 5. In addition, the hopper 4 has a slide gate 7, the position of which determines a cross-section of the outfeed opening 6. In particular, the outlet cross-section A may have a cross-section that is larger in the middle than on the outside in a transverse direction transverse to the conveying direction of the conveying device 5. In addition, the outlet cross-section A can have a cross-section that is circular, triangular or elliptical. The slide gate 7 can be designed in one or more parts. The outlet cross-section A can be limited symmetrically in the transverse direction by the slide gate 7 or it can be limited differently from the central axis in the one transverse direction from the other transverse direction.

In particular, the slide gate 7 can have an angle of 0° to 90° to the horizontal for setting the outlet cross-section A.

In FIG. 1, the slide gate 7 is shown in a first position and in FIG. 2, the slide gate 7 is shown in a second position. In the first position of the slide gate 7, the outlet opening 6 has a smaller outlet cross-section A than in the second position of the slide gate 7. Depending on the position of the slide gate 7, a different amount of bulk material 2 can flow/pour onto the conveying device 5.

According to the invention, the metering device 1 has a motor-operated actuator for adjusting the position of the slide gate 7, i.e., the outlet cross-section A. For example, the actuator can be designed as a linear motor or as a rotating (stepper) motor. For example, the actuator can be operated (hydraulically or) preferably electrically or pneumatically. Preferably, the outlet cross-section A is infinitely adjustable or step-by-step. By providing the actuator, the slide gate 7 can be adjusted/moved automatically/automated during the operation of the metering device 1 as a function of the operating parameters of the metering device 1.

In order to control or regulate the metering device 1, the metering device 1 may preferably have a control device 8 (cf. FIGS. 3, 5, 6 and 7). In particular, the control device 8 may be designed to (automatically) control the actuator (and thus the position of the slide gate 7 or the size/cross-section of the outlet opening 6) as a function of the operating parameters of the metering device 1.

One of the operating parameters is the outlet cross-section A, which is determined by the position of the slide gate 7. The outlet cross-section A can be adjusted by a linear or a rotary movement. For a reproducible behavior, it is necessary that the slide gate position follows the target value. For example, an actual position of the slide gate 7 is used by feeding the actual position to a controller that generates a suitable control variable for the drive of the slide gate 7. The preferably electric or pneumatic actuator can be a rotating motor or a linear actuator.

One of the operating parameters is a dumping height H. The dumping height H is determined in particular by the outlet cross-section A. In particular, the dumping height H is understood to mean the actual dumping height H(t) (cf. FIG. 7).

One of the operating parameters is a conveying velocity. The conveying velocity is the speed at which the conveying device 5 is moving. In terms of the conveying velocity, a distinction can be made between an actuating conveying velocity v(t), a target conveying velocity vo and an actual conveying velocity. As a rule, the actual feed rate corresponds to the actuating feed rate v(t).

One of the operating parameters is an on/off signal. In the case of the on/off signal, a distinction is made between an on-signal and an off-signal.

For example, one of the operating parameters can be a feed rate of the metering device 1. The feed rate indicates how much mass of bulk material is discharged per time at the discharge opening 3. Since the feed rate can only be adjusted indirectly via the conveying velocity v(t) and the dumping height H, and the dumping height H can only be adjusted indirectly via the outlet cross-section A, a distinction is made between a (predetermined) actual feed rate P(t) and a (predetermined) target feed rate Po. The actual feed rate P(t) can be determined, for example, by measuring a weight decrease of the metering device 1 per time interval. Alternatively, the actual feed rate P(t) can be determined by multiplying a load of the conveying device 5, which depends on the dumping height H and dimensions of the conveying device 5, by conveying velocity v(t).

Figure 3:
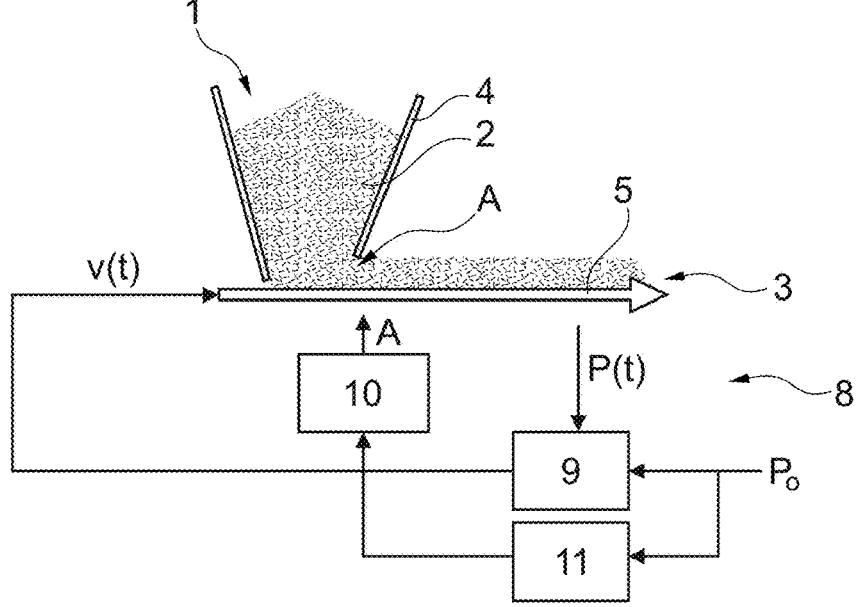
FIG. 3 shows a schematic representation of a metering device with a control device.

FIG. 3 shows a schematic representation of the control device 8 in an example. In particular, the control device 8 may have a feed rate control loop with a first controller 9, wherein the first controller 9 controls the feed rate using the conveying velocity v(t) as a control variable. The target feed rate Po is predefined and forms a guide variable for the first controller 9. For this purpose, a control difference between the target feed rate Po and the actual feed rate P(t) is determined. The control difference is an input variable of the first controller 9. On the basis of the control difference, the first controller 9 generates a control variable, in this case in the form of the conveying velocity v(t), as an output signal in accordance with its characteristic transmission function and thus acts on the metering device 1. The first controller 9 can preferably be designed as a PID controller. Alternatively, it is also possible to use a different type of controller for the first controller 9.

In addition, the control device 8 may have a control element 10, which is designed in such a way that the control element 10 controls the outlet cross-section A (and thus the position of the slide gate 7 and thus the actuator) as a function of the target feed rate Po.

The control device 8 may have a filter 11 designed in such a way that the filter 11 smooths the target feed rate Po as the input variable for the control of the outlet cross-section A. In an example, a time constant of the first controller 9 can be shorter than a filter time constant of the filter 11. Due to the filter time constant, which is set to be significantly larger than the resulting time constant of the guide behavior of the first controller 9, rapid changes in the target feed rate Po can be smoothed out and large metering errors can be avoided.

Figure 4:
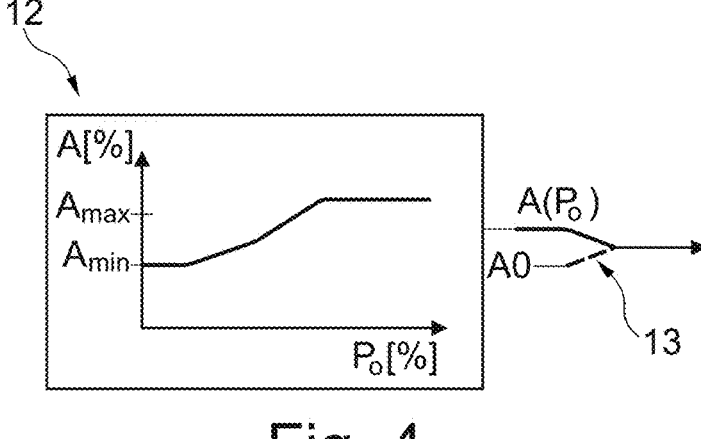
FIG. 4 shows a feed rate-outlet characteristic curve.

In particular, the control device 8 can be designed in such a way that it controls the outlet cross-section A on the basis of a feed rate-outlet cross-section characteristic curve 12 (see FIG. 4). This means that the control element 10 adjusts the outlet cross-section A according to the characteristic curve 12 as a function of the target feed rate Po. For example, the characteristic curve 12 can be described by an analytical equation or defined by vertices. The characteristic curve 12 can be determined, for example, when the metering device 1 is put into operation.

In the example shown, the characteristic curve 12 runs monotonically ascending between a minimum cross-section Amin and a maximum cross-section Amax. This means that the outlet cross-section A is small at a low target feed rate Po in order to achieve a constant discharge behavior and thus a high metering consistency, and at a large target feed rate Po is large in order to be able to realize the large target feed rate Po. Preferably, the minimum cross-section Amin can be limited depending on the type, in particular the particle size, of the bulk material 2 so that the bulk material 2 can flow out of the hopper 4. Preferably, the minimum cross-section Amin can be limited depending on a predetermined useful signal-to-error ratio. In this context, the useful signal is understood to be a measured value of the actual feed rate P(t) or the loading of the conveying device 5, and the error is understood to be a measurement error of the measurement method used for the useful signal. Preferably, the maximum cross-section Amax can be determined depending on the type of bulk material, in particular the particle size, and/or the dimensions of the conveying device 5. In particular, the maximum cross-section Amax can be limited in such a way that the bulk material 2 cannot flow out of the hopper 4 without activity on the part of the conveying device 5.

The control device 8 may have a switch 13 designed to control the outlet cross-section A as a function of the on/off signal of the metering device 1. In particular, the control device 8 may be designed in such a way that, if the on/off signal is an off-signal, it controls the actuator to an off-position Ao of the slide gate and operates the conveying device 5 for a predetermined period of time after reaching the off-position Ao of the slide gate 7 and/or until a predetermined actual dumping height H is undercut.

In this case, the predetermined time duration can also be zero seconds, i.e., the conveying device 5 is stopped immediately. If the on/off signal is an on-signal, the control device 8 controls as described above and below.

FIG. 5 shows a schematic representation of the control device 8 in an example. The control device 8 has the first control loop with the first controller 9, wherein the first controller 9 is designed as in the first example.

In addition, the control device 8 may have a second control loop with a second controller 14, wherein the second controller 14 controls the conveying velocity using the outlet cross-section A as the control variable. The target conveying velocity vo is predetermined and forms a guide variable for the second controller 14. For this purpose, a control difference between the target conveying velocity vo and the actuating or actual conveying velocity v(t) is determined. The control difference is an input variable of the second controller 14. On the basis of the control difference, the second controller 14 generates a control variable, in this case in the form of the outlet cross-section A, as an output signal in accordance with its characteristic transmission function, and thus acts on the metering device 1. The second controller 14 can preferably be designed as a PID controller. Alternatively, the second controller 14 can be designed as a two-point controller. Alternatively, it is also possible to use a different type of controller for the second controller 14.

The first controller 9 and the second controller 14 can be cascaded. This means that the control difference is determined from the controller output variable of the first controller 9, in this case the actuating or actual conveying velocity v(t), and the guide variable of the second controller 14, in this case the target conveying velocity vo. In an example, the time constant of the first controller 9 should be shorter than a time constant of the second controller 14 to avoid control vibrations.

The control device 8 can be designed to determine the characteristic curve 12 (cf. FIG. 4) by changing the target feed rate Po over its operating range and by recording the control variable of the second control loop, i.e., the outlet cross-section A, as a function of the target feed rate Po.

In addition, the control device 8 can have a pilot control that controls the outlet cross-section A on the basis of the characteristic curve 12. The pilot control can be constructed in the same way as the example shown in FIG. 3. Preferably, the pilot control is used for coarse adjustment and the second controller 14 for fine adjustment of the outlet cross-section A.

FIG. 6 shows a schematic representation of the control device 8 in an example. The control device 8 has the first control loop with the first controller 9, wherein the first controller 9 is designed as in the first example.

In addition, the control device 8 may have a vibration analyzer 15 to avoid vibrations of the actuating-conveying velocity or the actual conveying velocity v(t), wherein the vibration analyzer is designed to change the outlet cross-section A by a predetermined or random amount when vibrations of the actuating-conveying velocity or the actual conveying velocity v(t) are detected. In an example, the time constant of the first controller 9 should be shorter than the time constant of the vibration analyzer 15 to avoid amplification of the vibrations. In particular, the control device 8 is designed to transmit an information signal to a user when vibrations of the actuating conveying velocity or the actual conveying velocity v(t) are detected.

Alternatively or additionally, the control device 8 may have an outlet cross-section analyzer 16 and an outlet cross-section control element to avoid operation outside a range between the minimum cross-section and the maximum cross-section. The outlet cross-section analyzer 16 is designed to detect an outlet cross-section A moving towards the minimum cross-section and/or the maximum cross-section. The outlet cross-section control element is designed to reduce the conveying velocity v(t) when the outlet cross-section A is detected as it moves towards the minimum cross-section and to increase the conveying velocity v(t) when the outlet cross-section A is detected as it moves towards the maximum cross-section. In an example, the time constant of the first controller 9 should be shorter than the time constant of the outlet cross-section analyzer 16.

Alternatively or additionally, the control device 8 may have a conveying velocity analyzer 17 and a conveying velocity control element to avoid operating outside a range between a minimum conveying velocity and a maximum conveying velocity. The conveying velocity analyzer 17 is designed to detect a conveying velocity v(t) moving towards the minimum conveying velocity and/or the maximum conveying velocity. The conveying velocity control element is designed to reduce the outlet cross-section A when the conveying velocity v(t) moving towards the minimum conveying velocity is detected, and to increase the outlet cross-section A when the conveying velocity v(t) moving towards the maximum conveying velocity is detected. In an example, the time constant of the first controller 9 should be shorter than the time constant of the conveying velocity analyzer 17.

FIG. 7 shows a schematic representation of the control device 8 in an example. The control device 8 has the first control loop with the first controller 9, wherein the first controller 9 is designed as in the first example.

In addition, the control device 8 can have a dumping height control loop with a third controller 18, wherein the third controller 18 controls the dumping height H using the outlet cross-section A as a control variable. The target dumping height Ho is specified and forms a guide variable for the third controller 18. For this purpose, a control difference between the target dumping height Ho and the actual dumping height H(t) is determined. The control difference is an input variable of the third controller 18. On the basis of the control difference, the third controller 18 generates a control variable, in this case in the form of the outlet cross-section A, as an output signal in accordance with its characteristic transmission function, and thus acts on the metering device 1.

Alternatively or additionally, the control device 8 can have a material bridge analyzer and a material bridge control element to avoid material bridges. The material bridge analyzer is designed to detect when a predetermined difference between an actual dumping height H(t) and a target dumping height Ho is exceeded. If the predetermined difference is exceeded, the material bridge control element is designed to change the outlet cross-section A by a predetermined amount, especially for a short time, in particular to increase it. In particular, the control device 8 may be designed to transmit an information signal to a user when a predetermined difference between an actual dumping height H(t) and a target dumping height Ho is exceeded. For example, the control device may be designed to determine the dumping height H(t) gravimetrically—by means of one or more weighing sensors—by an optical sensor, by a mechanical sensor, by an electromagnetic sensor, by ultrasound or by radar.

The control device 8 may have a linearizing element that represents a non-linear relationship between the outlet cross-section A and the dumping height H via an outlet cross-section-dumping height characteristic curve. In an example, the control device 8 can be designed to determine the outlet cross-section-dumping height characteristic curve by changing the outlet cross-section A over its operating range and recording the (bulk material-dependent) dumping height H as a function of the outlet cross-section A. Thus, the linearizing element compensates for the non-linearity between the outlet cross-section A and the dumping height H in order to stabilize the control.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A metering device comprising:
a hopper to store bulk material, the hopper having an outlet opening through which the bulk material is adapted to be conveyed from the hopper;
a slide gate, a position of the slide gate determining an outlet cross-section of the outlet opening of the hopper;
a discharge opening to discharge the bulk material from the metering device;
a conveying device to convey the bulk material from the outlet opening of the hopper to the discharge opening;
a control device to control the metering device; and
a motor-operated actuator to adjust the slide gate,
wherein a position of the slide gate and the outlet cross-section are automatically controlled via the control device as a function of a target feed rate, such that a dumping height of the bulk material being conveyed on the conveying device is changeable during operation of the metering device by mechanically adjusting the outlet cross-section.

2. The metering device according to claim 1, wherein the target feed rate is a process parameter, and wherein the control device is configured such that a position of the slide gate and thus a control of the outlet opening is dependent on at least one other process parameter comprising: on-signal, actual outlet cross-section, actual dumping height, hopper fill level, conveying velocity of the conveying device, and/or a further control variable of the metering device.

3. The metering device according to claim 1, wherein the control device has a feed rate control loop with a first controller, wherein the first controller controls a feed rate using a conveying velocity of the conveying device as a control variable, and wherein the control device is configured to control the outlet cross-section via the feed rate based on a feed rate-outlet cross-section characteristic curve, the characteristic curve being described by an analytical equation or is defined by vertices, and the characteristic curve being monotonically ascending between a minimum cross-section and a maximum cross-section.

4. The metering device according to claim 3, wherein the control device has a dumping height control loop with a dumping height controller, and wherein the dumping height controller controls the dumping height of the bulk material being conveyed on the conveying device using the outlet cross-section as another control variable.

5. A metering device comprising:
a hopper to store bulk material, the hopper having an outlet opening through which the bulk material is adapted to be conveyed from the hopper;
a slide gate, a position of the slide gate determining an outlet cross-section of the outlet opening of the hopper;
a discharge opening to discharge the bulk material from the metering device;
a conveying device to convey the bulk material from the outlet opening of the hopper to the discharge opening;
a control device to control the metering device; and
a motor-operated actuator to adjust the slide gate, the motor-operated actuator being controlled via the control device as a function of a target feed rate,
wherein the control device has a feed rate control loop with a first controller, wherein the first controller controls a feed rate using a conveying velocity of the conveying device as a control variable, and wherein the control device is configured to control the outlet cross-section via the feed rate based on a feed rate-outlet cross-section characteristic curve, the characteristic curve being described by an analytical equation or is defined by vertices, and the characteristic curve being monotonically ascending between a minimum cross-section and a maximum cross-section, and
wherein the control device has a filter which is configured to smooth out a signal for the feed rate as an input variable for the control of the outlet cross-section.

6. A metering device comprising:
a hopper to store bulk material, the hopper having an outlet opening through which the bulk material is adapted to be conveyed from the hopper;
a slide gate, a position of the slide gate determining an outlet cross-section of the outlet opening of the hopper;
a discharge opening to discharge the bulk material from the metering device;
a conveying device to convey the bulk material from the outlet opening of the hopper to the discharge opening;
a control device to control the metering device; and
a motor-operated actuator to adjust the slide gate, the motor-operated actuator being controlled via the control device as a function of a target feed rate,
wherein the control device has a feed rate control loop with a first controller, wherein the first controller controls a feed rate using a conveying velocity of the conveying device as a control variable, and wherein the control device is configured to control the outlet cross-section via the feed rate based on a feed rate-outlet cross-section characteristic curve, the characteristic curve being described by an analytical equation or is defined by vertices, and the characteristic curve being monotonically ascending between a minimum cross-section and a maximum cross-section, and
wherein the control device has a conveying velocity control loop with a second controller, wherein the second controller further controls the conveying velocity using an actual outlet cross-section as a control variable.

7. A metering device comprising:
a hopper to store bulk material, the hopper having an outlet opening through which the bulk material is adapted to be conveyed from the hopper;
a slide gate, a position of the slide gate determining an outlet cross-section of the outlet opening of the hopper;
a discharge opening to discharge the bulk material from the metering device;

a conveying device to convey the bulk material from the outlet opening of the hopper to the discharge opening;

a control device to control the metering device; and a motor-operated actuator to adjust the slide gate, the motor-operated actuator being controlled via the control device as a function of a target feed rate, wherein the control device has a feed rate control loop with a first controller, wherein the first controller controls a feed rate using a conveying velocity of the conveying device as a control variable, and wherein the control device is configured to control the outlet cross-section via the feed rate based on a feed rate-outlet cross-section characteristic curve, the characteristic curve being described by an analytical equation or is defined by vertices, and the characteristic curve being monotonically ascending between a minimum cross-section and a maximum cross-section, and wherein the control device has a vibration analyzer and a vibration control element to avoid vibrations of the conveying velocity, wherein the vibration analyzer is configured to detect vibrations of the conveying velocity and the vibration control element is configured to change the outlet cross-section by a predetermined or random amount when the vibrations of the conveying velocity are detected.

8. The metering device according to claim 7, wherein the control device has an outlet cross-section analyzer and an outlet cross-section control element to avoid operation outside a range between the minimum cross-section and the maximum cross-section, wherein the outlet cross-section analyzer is configured to detect the outlet cross-section moving towards the minimum cross-section and/or the maximum cross-section and the outlet cross-section control element is configured to reduce the conveying velocity when the outlet cross-section moving towards the minimum cross-section is detected and to increase the conveying velocity when the outlet cross-section moving towards the maximum cross-section is detected.

9. The metering device according to claim 7, wherein the control device has a conveying velocity analyzer and a conveying velocity control element for avoiding operation outside a range between a minimum conveying velocity and a maximum conveying velocity, wherein the conveying velocity analyzer is configured to detect the conveying velocity moving towards the minimum conveying velocity and/or the maximum conveying velocity, and the conveying device control element is configured to reduce the outlet cross-section when the conveying velocity moving towards the minimum conveying velocity is detected, and to increase the outlet cross-section when the conveying velocity moving towards the maximum conveying velocity is detected.

* * * * *